United States Patent [19]
Morikawa et al.

[11] Patent Number: 5,091,818
[45] Date of Patent: Feb. 25, 1992

[54] OVERVOLTAGE PROTECTING CIRCUIT

[75] Inventors: Yuji Morikawa, Kawasaki; Hayako Tsurumaki, Tokyo, both of Japan

[73] Assignee: Kabushiki Kaisha Toshiba, Kanagawa, Japan

[21] Appl. No.: 631,425

[22] Filed: Dec. 21, 1990

[30] Foreign Application Priority Data
Dec. 21, 1989 [JP] Japan .................................. 1-329710

[51] Int. Cl.$^5$ .............................................. H02H 9/04
[52] U.S. Cl. ......................................... 361/56; 361/57
[58] Field of Search ................. 361/54, 56, 57, 91, 361/93, 100, 101, 18; 323/299; 307/342, 350, 566, 567, 549, 363

[56] References Cited
U.S. PATENT DOCUMENTS

| | | | |
|---|---|---|---|
| 4,334,256 | 6/1982 | Mings | 361/56 |
| 5,027,250 | 6/1991 | Cini et al. | 361/18 |

*Primary Examiner*—A. D. Pellinen
*Assistant Examiner*—Christopher S. Schultz
*Attorney, Agent, or Firm*—Banner, Birch, McKie & Beckett

[57] ABSTRACT

In addition to a circuit for clamping a power supply voltage supplied from a power supply to a rated voltage, a circuit for clamping the power supply voltage to a voltage of less than the rated voltage is arranged. Even if it is necessary to flow a large current into the voltage clamping transistor for overvoltage protection, a large current can be flowed within a safe operating area of the transistor if the transistor is operated at a low voltage. Damage of the voltage clamping transistor or degradation of reliability can be prevented.

2 Claims, 2 Drawing Sheets

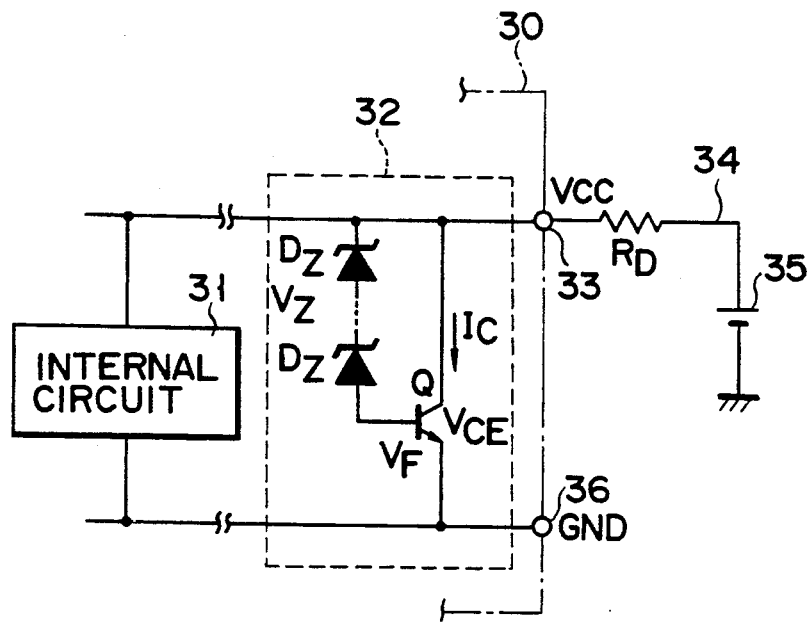
F I G. 1
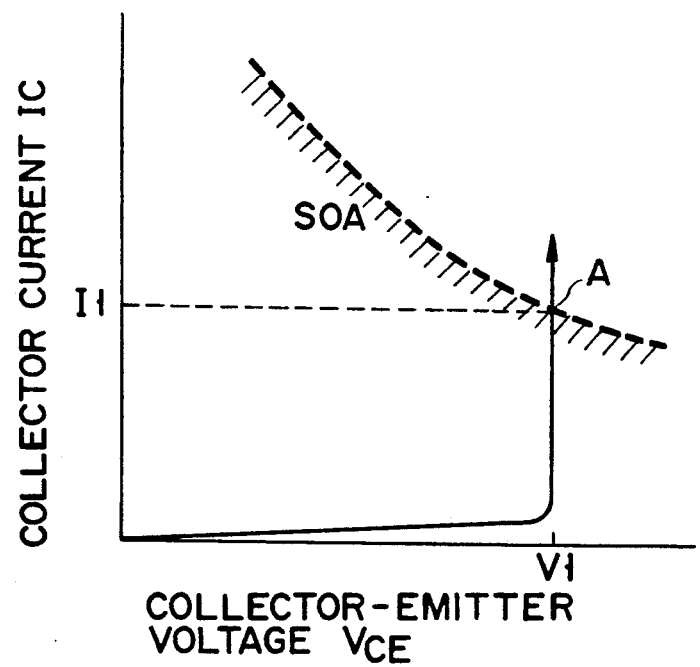
F I G. 2

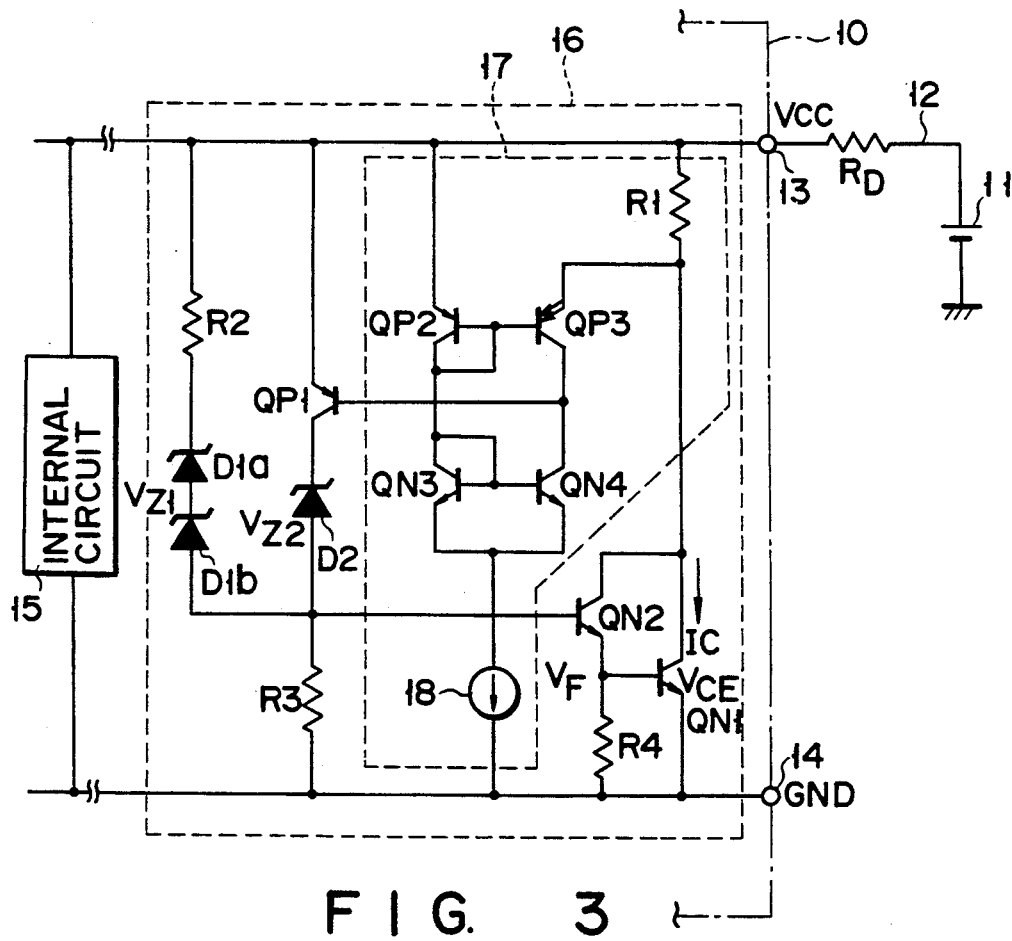
F I G. 3
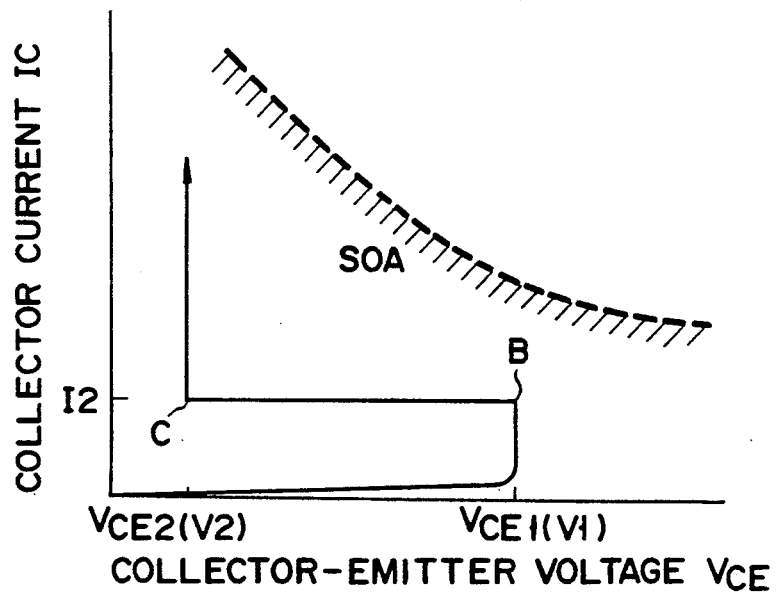
F I G. 4

OVERVOLTAGE PROTECTING CIRCUIT

BACKGROUND OF THE INVENTION

1. Field of the Invention

The present invention relates to an overvoltage protecting circuit incorporated in a semiconductor integrated circuit and, more particularly, to an overvoltage protecting circuit used for preventing a load damp of a vehicle battery.

2. Description of the Related Art

FIG. 1 is a circuit diagram showing a conventional overvoltage protecting circuit. For example, in a semiconductor integrated circuit used on a vehicle and receiving a power supply voltage from a vehicle battery, an overvoltage protecting circuit is incorporated for protecting an internal circuit upon an increase in battery voltage above a predetermined value by a surge or the like, i.e., for preventing a load damp. A semiconductor integrated circuit 30 shown in FIG. 1 incorporates an overvoltage protecting circuit 32 for protecting an internal circuit 31. A $V_{CC}$ power supply terminal 33 is connected to a vehicle battery 35 by a wiring 34 through a protective resistor $R_D$. The internal circuit 31 is arranged to be operated within a rated voltage. In the overvoltage protecting circuit 32, a collector-emitter path of a voltage clamping npn transistor Q is connected between the $V_{CC}$ power supply terminal 33 and a ground potential (GND) terminal 36.

A plurality of Zener diodes $D_Z$ for generating a predetermined clamping voltage are connected in series between the $V_{CC}$ power supply terminal 33 and the base of the npn transistor Q in a backward direction.

FIG. 2 is a characteristic curve showing a relationship between a collector-emitter voltage $V_{CE}$ and a collector current $I_C$ of the npn transistor Q in an overvoltage protecting operation. A hatched area below a broken line is a safe operating area (SOA) of the voltage clamping transistor Q.

An operation of the overvoltage protecting circuit shown in FIG. 1 will be described hereinafter.

When a voltage of the battery 35 is increased, a current in a backward direction flows into the Zener diodes $D_Z$ to turn on the npn transistor Q. As a result, a potential of the $V_{CC}$ power supply terminal 33 is kept at the sum (rated voltage V1) of a base-emitter voltage $V_F$ of the npn transistor Q and the sum VZ of voltages of a plurality of Zener diodes $D_Z$. Therefore, the internal circuit 31 is protected from the overvoltage.

Upon the overvoltage protection, however, even if the voltage (the collector-emitter voltage $V_{CE}$ of the npn transistor Q here) between the $V_{CC}$ power supply terminal 33 and the ground terminal 36 is clamped to the rated voltage $V_1$, when a collector current $I_C$ of the npn transistor Q necessary for this clamping is increased, the collector current $I_C$ rises above the safe operating area of the voltage clamping transistor Q shown by the broken line if the current $I_C$ is increased beyond a predetermined value I1 (point A in FIG. 2), so that the voltage clamping transistor Q may be damaged or reliability may be degraded. On the other hand, it is uneconomical that the voltage clamping transistor Q is made in a large size to ensure the reliability.

SUMMARY OF THE INVENTION

The present invention has been made in order to overcome the above drawback, and has as its object to provide an overvoltage protecting circuit capable of flowing a large current within a range of a safe operating area of a voltage clamping transistor even if a current necessary for clamping a voltage to a rated voltage or less becomes large upon overvoltage protection, so that an internal circuit can be protected without causing damage of the voltage clamping transistor or degradation of reliability.

There is provided an overvoltage protecting circuit, incorporated in a semiconductor integrated circuit, for clamping a voltage between a power supply terminal and a ground terminal to a predetermined rated voltage or less upon supply of a current from an external power supply through a protective resistor, comprising: a voltage clamping npn transistor which is arranged between the power supply terminal and the ground terminal, and the emitter of which is connected to the ground terminal; a first clamping circuit connected between the power supply terminal and the base of the voltage clamping npn transistor for clamping the voltage to the rated voltage; a switch element and a second clamping circuit for clamping the voltage to a voltage lower than the rated voltage, the switch element and the second clamping circuit being connected in series between the power supply terminal and the base of the voltage clamping npn transistor; and a switch control circuit having a resistor connected between the power supply terminal and the collector of the voltage clamping npn transistor, for ON/OFF-controlling the switch element in accordance with a current flowing through the resistor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a circuit diagram showing a conventional overvoltage protective circuit;

FIG. 2 is a graph showing characteristics between a collector current $I_C$ and a collector-emitter voltage $V_{CE}$ of a transistor Q in an overvoltage protecting circuit 32 shown in FIG. 1;

FIG. 3 is a circuit diagram showing an embodiment of an overvoltage protecting circuit according to the present invention; and FIG. 4 is a graph showing characteristics between a collector current $I_C$ and a collector-emitter voltage $V_{CE}$ of a transistor QN1 in an overvoltage protecting circuit 16 in FIG. 3.

DETAILED DESCRIPTION OF THE PREFERRED EMBODIMENT

An embodiment of an overvoltage protecting circuit according to the present invention will be described in detailed with reference to the accompanying drawings.

FIG. 3 is a circuit diagram showing an embodiment of an overvoltage protecting circuit 16 according to the present invention. Referring to FIG. 3, a battery 11 for a vehicle and a part of a semiconductor integrated circuit 10 which is used in a vehicle and which receives a $V_{CC}$ power supply voltage from the battery 11 through a wiring 12 and an external protective resistor RD are shown. In the semiconductor integrated circuit 10, reference numeral 13 denotes a $V_{CC}$ power supply terminal for receiving a power supply voltage from an external power supply; 14, a ground terminal; 15, an internal circuit designed so as to be operated within a rated voltage; and 16, the overvoltage protecting circuit for protecting the internal circuit 15 from an overvoltage by clamping a voltage between the $V_{CC}$ power supply terminal 13 and the ground terminal 14 to a predetermined rated voltage or less.

The overvoltage protecting circuit 16 is constituted by a voltage clamping npn transistor (constituted by, e.g., first and second npn transistors QN1 and QN2, which are Darlington-connected with each other), which is arranged between the VCC power supply terminal 13 and the ground terminal 14, and the emitter of which is connected to the ground terminal 14; a plurality of (two in this embodiment) first Zener diodes D1a and D1$_b$ and a second resistor R2 connected in series in a backward direction between the $V_{CC}$ power supply terminal 13 and the base of the second npn transistor QN2; a switch element constituted by, e.g., a first pnp transistor QP1, and connected between the $V_{CC}$ power supply terminal 13 and the base of the second npn transistor QN2; a smaller number of (one in this embodiment) second Zener diodes D2 than the number of the first Zener diodes D1$_a$ and D1$_b$, connected in series with the first pnp transistor QP1 between the $V_{CC}$ power supply terminal 13 and the base of the second npn transistor QN2 in a backward direction; a third resistor R3 connected between the base of the second npn transistor QN2 and the ground terminal 14; a fourth resistor R4 connected between the base of the first npn transistor QN1 and the ground terminal 14; and a switch control circuit 17 which is connected between the $V_{CC}$ power supply terminal 13 and the ground terminal 14, and which performs ON/OFF control of the first pnp transistor QP1 in accordance with a collector current $I_C$ flowing in the first npn transistor QN1.

The switch control circuit 17 is constituted by a resistor R1, which has a very low resistance, one terminal of which is connected to the $V_{CC}$ power supply terminal 13, and the other terminal of which is connected to the collector of the first npn transistor QN1; a second pnp transistor QP2, the emitter of which is connected to the $V_{CC}$ power supply terminal 13, and the base and collector of which are connected to each other; a third pnp transistor QP3, the base of which is connected to the base of the second pnp transistor QP2, and the emitter of which is connected to a connection point between the first resistor R1 and the collector of the first npn transistor QN1; a third npn transistor QN3, the collector of which is connected to the collector of the second pnp transistor QP2, and the collector and base of which are connected to each other; a fourth npn transistor QN4, the collector of which is connected to the collector of the third pnp transistor QP3, and the base and the emitter of which are respectively connected to the base and the emitter of the third npn transistor QN3; and a constant current source 18 connected between the ground terminal and a common connection point between the emitter of the third npn transistor QN3 and the emitter the fourth npn transistor QN4. A connection point between the collectors of the third pnp transistor QP3 and the fourth npn transistor QN4 is connected to the base of the first pnp transistor QP1. The resistor R1 has a resistance which allows a negligible voltage drop when a current equal to a half or less of a constant current $I_1$ flowing the constant current source 18 flows.

An operation of the overvoltage protecting circuit 16 according to the present invention will be described in detail with reference to FIGS. 3 and 4.

The overvoltage protecting circuit 16 is incorporated in the semiconductor integrated circuit 10. When a voltage of the external power supply 11 is abruptly increased, a current is flowed through the external protective resistor RD from the external power supply 11 to cause a voltage drop. As a result, a voltage to be applied to the internal circuit 15 can be clamped to the rated voltage or less. If an increase in voltage is large, therefore, the current flowing in the protective resistor RD becomes large. The current flowing in the protective resistor RD flows into the resistor R1, and flows into the ground terminal through the npn transistor QN1 as a collector current.

In a normal operation state, the first Zener diodes D1a and D1b are in an OFF state, and the voltage clamping npn transistors QN1 and QN2 are also in an OFF state. In this case, the third pnp transistor QP3 receives a predetermined base drive current from the constant current source 18, and is set in an ON state. For this reason, since the first pnp transistor QP1 cannot receive a base current for driving itself, the first pnp transistor QP1 is in an OFF state. The second pnp transistor QP2, the third npn transistor QN3, and the fourth npn transistor QN4 are all in an ON state, and a constant current flows into the constant current source 18. A collector current of the transistor QP3 is a half of the current of the constant current source 18.

When a voltage of the battery 11 is abruptly increased to be an overvoltage state, a current in a backward direction flows into the first Zener diodes D1a and D1$_b$ so that the npn transistors QN1 and QN2 for voltage clamping are turned on. A potential of the $V_{CC}$ power supply terminal 13 is kept in the sum (rated voltage $V_1$) of a voltage $V_F$ between the emitter of the first npn transistor QN1 and the base of the second npn transistor QN2, the sum $V_{ZI}$ of Zener voltages of the first Zener diodes D1$_a$ and D1$_b$, and a voltage drop across the second resistor R2. If a voltage drop across the resistor R1 is neglected, a collector-emitter voltage $V_{CEI}$ of the first npn transistor QN1 can be obtained by an equation $V_{CEI} \approx V_1$. The third pnp transistor QP3 is still in an ON state, and the first pnp transistor QP1 is still in an OFF state.

When the voltage of the battery 11 is further increased, the collector current $I_C$ of the first npn transistor QN1 necessary for clamping the voltage between the $V_{CC}$ power supply terminal 13 and the ground terminal 14 to the rated voltage $V_l$ becomes large. When the collector current $I_C$ becomes larger than a current $I_2$ (point B shown in FIG. 4) within the safe operating area of the npn transistor QN1 in the collector-emitter voltage $V_{CEI}$ ($V_l$), the first resistor R1 causes a larger voltage drop. For this reason, an emitter-base voltage $V_{BE}$ of the third pnp transistor QP3 is decreased, and the collector current of the third pnp transistor QP3 is decreased. As a result, a current begins to flow into the base of the first pnp transistor QP1 to turn on the first pnp transistor QP1. A current in a backward direction is flowed in the second Zener diode D2, and the current to the first Zener diodes $Dl_a$ and $Dl_b$ is stopped. A potential of the $V_{CC}$ power supply terminal 13 is kept in the sum voltage $V_2$ (point C shown in FIG. 4) of a voltage VF between the emitter of the first npn transistor QN1 and the base of the second npn transistor QN2, a Zener voltage $V_{Z2}$ of the second Zener diodes D2, and a collector-emitter voltage of the first pnp transistor QP1. As a result, a clamping voltage is immediately decreased from the rated voltage $V_1$ to the voltage $V_2$. In this case, since the number of the second Zener diodes D2 is designed to be smaller than the number of the first Zener diodes $Dl_a$ and $Dl_b$, the sum of the Zener voltages satisfies $V_{Z1} < V_{Z2}$. Therefore, the value of the voltage $V_2$ is equal to the rated voltage $V_1$ or less, and the internal circuit 15 can be protected from the overvoltage. The collector current $I_C$ of the first npn transistor QN1 at this time is substantially equal to the collector current $I_2$ at point B. In a state wherein the clamping voltage is decreased to the voltage $V_2$, the collector current $I_C$ of the first npn transistor QN1 is increased. At this time, the collector current IC falls within the safe operating area of the first npn transistor QN1.

That is, according to the overvoltage protecting circuit 16 of the above-described embodiment, even if the external power supply voltage is increased to a clamping disable level of the conventional overvoltage protecting circuit, the internal circuit 15 can be protected without damage of the voltage clamping npn transistor QN1 of the same size as in the conventional overvoltage protecting circuit or without degradation of reliability by effectively using the safe operating area of the npn transistor QN1. In this case, high reliability of the npn transistor QN1 can be ensured without increasing the size of the voltage clamping npn transistor QNI, resulting in an economic advantage.

A thyristor operation as described above is reversible. If a power supply voltage of the battery 11 is decreased to decrease the collector current $I_C$ of the first npn transistor QN1, an operating point is automatically moved from the point C to the point B shown in FIG. 4, so that a predetermined reset operation (power supply interruption) to cause the circuit to return to a normal operation state is not necessary.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An overvoltage protecting circuit incorporated in a semiconductor circuit, for clamping a voltage between a power supply terminal and a ground terminal to not more than a predetermined rated voltage upon supply of a current from an external power supply through a protective resistor, comprising:

a voltage clamping npn transistor which is arranged between said power supply terminal and said ground terminal, and an emitter of which is connected to said ground terminal;

a first clamping circuit connected between said power supply terminal and a base of said voltage clamping npn transistor, for clamping a voltage to the rated voltage;

a switch element and a second clamping circuit for clamping a voltage to a voltage less than the rated voltage, said switch element and said second clamping circuit being connected in series between said power supply terminal and the base of said voltage clamping npn transistor; and a switch control circuit having a resistor connected between said power supply terminal and a collector of said voltage clamping npn transistor, for ON/OFF-controlling said switch element in accordance with a current flowing through said resistor.

2. A circuit according to claim 1, wherein said first clamping circuit is constituted by a plurality of first Zener diodes connected in series between said power supply terminal and the base of said voltage clamping npn transistor in a backward direction, and said second clamping circuit is constituted by a smaller number of second Zener diodes than that of first Zener diodes, said second Zener diode being connected between said power supply terminal and the base of said voltage clamping npn transistor in a backward direction.

* * * * *